XXXXXX

United States Patent [19]
Michiyuki et al.

[11] Patent Number: 5,813,314
[45] Date of Patent: Sep. 29, 1998

[54] DOUBLE-HEADED SWASH-PLATE OPERATED RECIPROCATING PISTON TYPE COMPRESSOR WITH IMPROVED THRUST BEARING ASSEMBLIES FOR THE SWASH PLATE

[75] Inventors: Hiromi Michiyuki; Hayato Ikeda; Masanobu Yokoi; Hisato Kawamura; Yasunori Ueda, all of Kariya, Japan

[73] Assignee: Kabushiki Kaisha Toyoda Jidoshokki Seisakusho, Kariya, Japan

[21] Appl. No.: 558,725

[22] Filed: Nov. 16, 1995

[30] Foreign Application Priority Data

Nov. 18, 1994 [JP] Japan .................................. 6-285291

[51] Int. Cl.⁶ ..................................................... F01B 3/00
[52] U.S. Cl. ................................... 92/71; 417/269; 74/60
[58] Field of Search ....................... 92/12.2, 71; 417/269; 91/499; 74/60

[56] References Cited

U.S. PATENT DOCUMENTS 5,233,913  8/1993  Muirhead .................................... 92/71
5,370,503  12/1994 Terauchi ................................. 417/222.2
5,528,976  6/1996  Ikeda et al. ................................. 92/71

FOREIGN PATENT DOCUMENTS 64-63669  3/1989  Japan .

*Primary Examiner*—Thomas E. Denion
*Attorney, Agent, or Firm*—Burgess, Ryan & Wayne

[57] ABSTRACT

A double-headed swash-plate operated reciprocating piston type refrigerant compressor having front and rear cylinder blocks provided with axial cylinder bores for receiving the double-headed pistons reciprocated by a swash plate mounted on an axial drive shaft rotating about an axis of rotation thereof together with the swash plate which is axially and rigidly supported by front and rear thrust bearing assemblies including an elastic unit arranged between the thrust bearing of at least one of the front and rear thrust bearing assemblies and a pressure receiving seat formed in the shoulder portion of the swash plate, the elastic unit providing the swash plate with a axial mechanical support having a rigidity which changes in a stepwise manner in response to a change in a discharge pressure of the refrigerant compressed by the compressor.

10 Claims, 3 Drawing Sheets

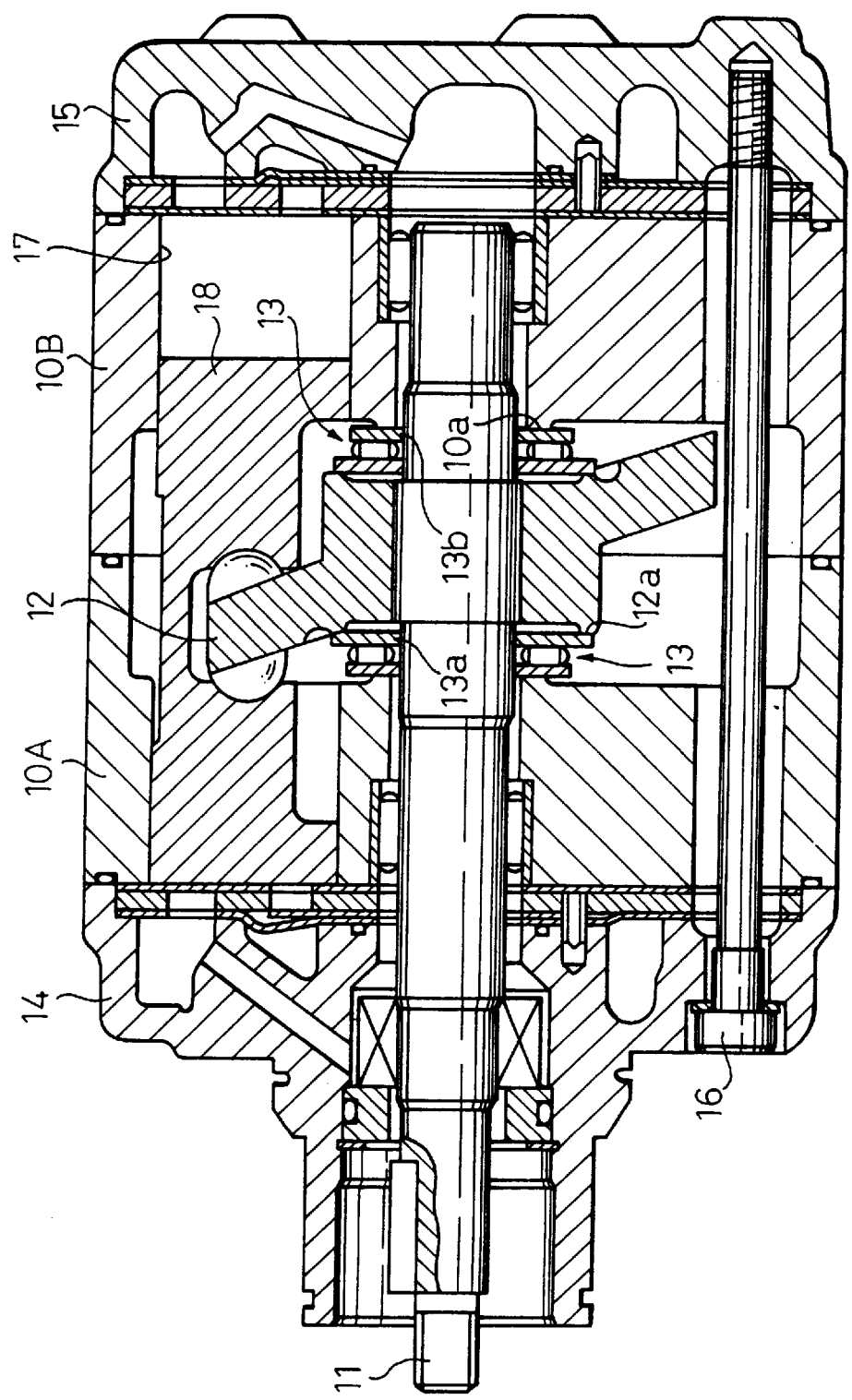

DOUBLE-HEADED SWASH-PLATE OPERATED RECIPROCATING PISTON TYPE COMPRESSOR WITH IMPROVED THRUST BEARING ASSEMBLIES FOR THE SWASH PLATE

BACKGROUND OF THE INVENTION

1. Field of the Invention

The present invention relates to a double-headed swash-plate operated reciprocating type refrigerant compressor non-exclusively adapted for use in a climate control system for an automobile. More particularly, the present invention relates to an improvement in front and rear thrust bearing assemblies incorporated in a double-headed swash-plate operated reciprocating piston type refrigerant compressor.

2. Description of the Related Art

Japanese Unexamined Patent Application (Kokai) No. 64-63669 (JP-A-64-63669) published on Mar. 9, 1989, discloses a double-headed swash-plate operated reciprocating piston type refrigerant compressor to compress refrigerant gas circulating through a climate control system for an automobile. The general construction of the compressor of JP-A-64-63669 is shown in FIG. 5, in which a pair of cylinder blocks, i.e., front and rear cylinder blocks 10A and 10B are axially combined together, and the front and rear ends of the combined cylinder blocks 10A and 10B are closed by front and rear housings 14 and 15.

The axially combined front and rear cylinder blocks 10A and 10B define a plurality of axial cylinder bores 17 in which a plurality of reciprocating double-headed pistons 18 are slidably received so as to implement compression of refrigerant gas and discharge of the compressed refrigerant gas.

The compressor has a drive shaft 11 rotatably supported by a pair of radial bearings mounted in the front and rear cylinder blocks 10A and 10B. The drive shaft 11 has a swash plate 12 mounted thereon at a position close to a connecting portion of the two cylinder blocks 10A and 10B so as to be rotated together with the drive shaft 11. The rotation of the swash plate 12 causes reciprocation of the above-mentioned plurality of double-headed pistons 18 in the respective cylinder bores 17.

The swash plate 12 is axially supported by a pair of thrust bearings 13 which are arranged between axial boss portions of the swash plate 12 and shoulders of the front and rear cylinder blocks 10A and 10B. The thrust bearings 13 are held in place by the application of an axial preload generated by screwing a plurality of long screw bolts 16 which tightly combine the front housing 14, the front cylinder block 10A, the rear cylinder block 10B, and the rear housing 15. When the screw bolts 16 are tightly screwed, an excessive part of the axial preload applied to the pair of thrust bearings 13 is absorbed due to elastic deformation of the race members of the thrust bearings 13. Namely, since the inner races 13a of both thrust bearings 13 are abutted, at the outer peripheral portions thereof, against annular seats 12a formed in the ends of the boss portions of the swash plate 12, and since the outer races 13b of both thrust bearings 13 are abutted, at the inner peripheral portions thereof, against annular seats 10a formed in the end of the shoulder portions of the front and rear cylinder blocks 10A and 10B, the inner and outer races 13a and 13b of both thrust bearings 13 can be resiliently deformed to absorb the excessive axial preload applied to the thrust bearings 13.

Nevertheless, the above-mentioned absorption of the axial preload due to only the resilient deformation of the race members of the thrust bearings 13 causes a problem such that when a relatively large axial preload is applied to the thrust bearings 13 to establish a rigid axial support for the swash plate 12, a drive power given by an automobile engine and consumed for driving the swash-plate compressor is increased. On the other hand, when a relatively small axial preload is applied to the thrust bearings 13 so as to reduce an axial support for the swash plate 12, a different problem occurs. Namely, when the compressor is used in a climate control system of the automobile, and when a discharge pressure of refrigerant gas is increased due to either driving of the automobile on a crowded road or a high environmental temperature condition outside the automobile, an increase in a moment acting on the swash plate 12 of the compressor via reciprocating pistons occurs. Thus, due to the large moment, the swash plate 12 is deformed to cause a vibratory motion thereof, so that a high-order extraordinary sound (noise) is generated due to vibrating of the swash plate 12. This vibrating and noise problem occurs even when a different type of elastic member is employed for absorbing the excessive portion of the preload applied to the thrust bearings 13.

SUMMARY OF THE INVENTION

Therefore, an object of the present invention is to eliminate the above-mentioned various problems encountered by the conventional thrust bearing assemblies of a double-headed swash-plate operated reciprocating piston type refrigerant compressor.

Another object of the present invention is to provide a double-headed swash-plate operated reciprocating piston type refrigerant compressor incorporating therein front and rear thrust bearing assembies which provide an axial rigid support for a swash plate, and thus, contribute not only to a reduction in consumption of a drive power supplied by an automobile engine, but also to suppression of noisy vibration of the swash plate.

A further object of the present invention is to provide a double-headed swash-plate operated reciprocating piston type refrigerant compressor provided with front and rear thrust bearing assemblies capable of presenting rigid mechanical support for a swash plate mounted on a drive shaft at two different stepwise mechanical rigidities to thereby solve the problems of a large amount of drive power required and of a high order noise generated by vibration of the swash plate.

In accordance with one aspect of the present invention, there is provided a double-headed swash-plate operated refrigerant compressor which comprises:

a pair of axially combined front and rear cylinder blocks having a plurality of cylinder bores for slidably receiving a plurality of double-headed pistons to compress a refrigerant gas therein, the axially combined cylinder blocks having a pair of front and rear shoulder portions axially spaced apart from and confronting to one another at an axially central portion thereof;

front and rear housings arranged for closing front and rear ends of the axially combined front and rear cylinder blocks;

an axial drive shaft rotatably supported, via radial bearings, in an axially extending bore centrally formed in the front housing and the combined front and rear cylinder blocks;

a swash plate mounted on the drive shaft and rotated together with the drive shaft so as to cause reciprocation of the double-headed pistons, the swash plate being disposed at a position between the front and rear shoulder portions of the combined front and rear cylinder blocks and having front and rear boss portions disposed so as to confront to the front and rear shoulder portions of the front and rear cylinder blocks; and front and rear thrust bearing assemblies including front and rear thrust bearings arranged between the front shoulder and boss portions, and between the rear shoulder and boss portions for providing a rigid axial support for the swash plate during rotation of the swash plate about an axis of rotation thereof;

wherein at least one of the front and rear thrust bearing assemblies comprises an elastic unit arranged between one of the front and rear thrust bearings and one of the front and rear boss portions of the swash plate, the elastic means cooperating with one of the front and rear thrust bearings so as to change rigidity of the axial support for the swash plate in a stepwise manner in response to a change in an operating condition of the compressor from a low to high discharge pressure operation and vice versa.

When each of the front and rear thrust bearings is a needle type thrust bearing including inner and outer races and a plurality of needles disposed between the inner and outer races, preferably, one of the front and rear thrust bearings is arranged in a manner such that the outer race thereof is in close contact with a flat pressure receiving seat formed in one of the shoulder portions of the front and rear cylinder blocks so as not to be deformable, and the inner race thereof is in constant contact with the elastic unit.

Alternately, when each of the front and rear thrust bearings is a needle type thrust bearing including inner and outer races and a plurality of needles disposed between the inner and outer races, one of the front and rear thrust bearings may be arranged in such a manner that a radially inner portion of the outer race thereof is in constant contact with a small annular pressure receiving seat formed in one of the shoulder portions of the front and rear cylinder blocks so that the outer race is deformable, and a radially outer portion of the inner race thereof is in constant contact with a large annular pressure receiving seat formed in one of the front and rear boss portions of the swash plate so that the inner race is deformable and comes into contact with the elastic unit when the operating condition of the compressor is in the high discharge pressure operation.

Preferably, the other of the front and rear thrust bearings of the front and rear thrust bearing assemblies is in close contact with flat pressure receiving seats formed in the shoulder and boss portions of the above-mentioned one of the front and rear cylinder blocks and the swash plate so as to prevent the thrust bearing from being deformed.

Preferably, the elastic unit comprises first and second dished disc springs, the first dished disc spring being constantly in contact with the one of the front and rear thrust bearings to thereby constantly apply a preload to the contacting thrust bearing over the entire operating condition of the compressor, and the second dished disc spring coming into contact with the one of the front and rear thrust bearings so as to increase the preload applied to the thrust bearing contacting with the first dished disc spring when the operating condition of the compressor changes from the low discharge pressure operation to the high discharge pressure operation.

Each of the thrust bearings of the front and rear thrust bearing assemblies may be replaced with a flat disc type thrust bearing including a slidable plate.

BRIEF DESCRIPTION OF THE DRAWINGS

The above and other objects, features, and advantages of the present invention will be made more apparent from the ensuing description of the preferred embodiments thereof in conjunction with the accompanying drawings wherein:

FIG. 5 is a longitudinal cross-sectional view of a conventional double-headed swash-plate operated refrigerant compressor.

DESCRIPTION OF THE PREFERRED EMBODIMENTS

It should be understood that throughout the description of the preferred embodiments, since the entire construction of a double-headed swash-plate operated refrigerant compressor in which the thrust bearing assembly according to the present invention is similar to that of the conventional compressor as shown in FIG. 5, a detailed description of the construction of the compressor except for the thrust bearing assembly is omitted here.

Figure 1:
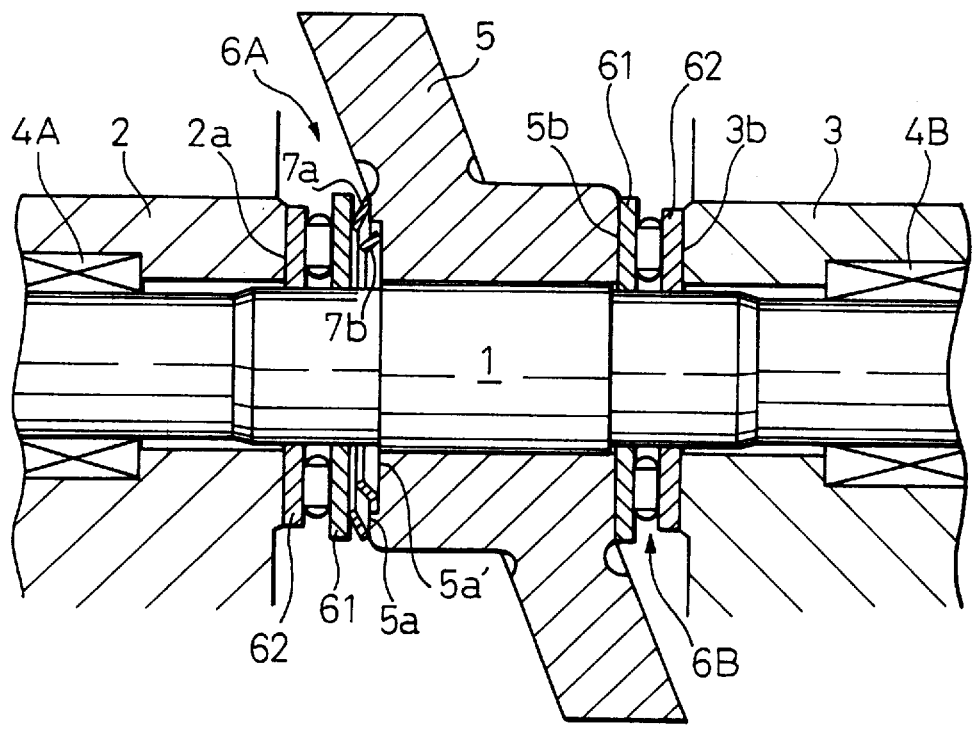
FIG. 1 is a partial cross-sectional view of a thrust bearing assembly accommodated in a double-headed swash plate type refrigerant compressor according to a first embodiment of the present invention.

Referring to FIG. 1, a drive shaft 1 of the double-headed swash-plate operated refrigerant compressor is rotatably supported by a pair of front and rear radial bearings 4A and 4B housed in coaxial central bores formed in the front and rear cylinder blocks 2 and 3.

The front and rear cylinder blocks 2 and 3 are axially and tightly combined together, and define a plurality of axial cylinder bores (not shown) so as to receive reciprocating double-heade pistons therein and to permit the pistons to compress refrigerant gas.

A swash plate 5 is integrally mounted on the drive shaft 1 so as to be rotated together with the drive shaft 1 when the latter is rotated by a drive power supplied by e.g., an automobile engine. The swash plate 5 is sandwiched by front and rear thrust bearings 6A and 6B located on the front and rear sides of the swash plate 5, respectively. The thrust bearings 6A and 6B are arranged between shoulder portions of the front and rear cylinder blocks 2 and 3 and the ends of the boss portions of the swash plate 5, and held in place under a preload applied thereto by the front and rear cylinder blocks 2 and 3 when the cylinder blocks are tightly combined by a plurality of long screw bolts (not shown in FIG. 1) which are similar to the bolts 16 in FIG. 5.

In the first embodiment of FIG. 1, the front thrust bearing assembly includes the above-mentioned front thrust bearings 6A, and the rear thrust bearing assembly includes the above-mentioned rear thrust bearing 6B.

The rear thrust bearing assembly is provided with a flat pressure receiving seat 5$b$ formed in the end of the rear boss portion of the swash plate 5 and a flat pressure receiving seat 3$b$ formed in the end of the shoulder portion of the rear cylinder block 3. The flat pressure receiving seats 5$b$ and 3$b$ axially confront one another, and sandwich the rear thrust bearing 6B therebetween. Namely, an inner race 61 and outer race 62 of the rear thrust bearing 6B are in close contact with the flat pressure receiving seats 5$b$ and 3$b$, so that the thrust bearing 6B is stably and rigidly supported between the swash plate 5 and the rear cylinder block 3.

The front thrust bearing assembly including the above-mentioned front thrust bearing 6A is provided with a flat pressure receiving seat 2a formed in the end of shoulder portion of the front cylinder block 2, and an annular pressure receiving seat 5a formed in an outer periphery of the end of the boss portion of the swash plate 5 so as to axially confront with the flat pressure receiving seat 2a. The front thrust bearing assembly is further provided with a circular pressure receiving seat 5a' recessed in the end of the boss portion of the swash plate 5 so as to be located radially inside and coaxially with the annular pressure receiving seat 5a. The front thrust bearing 6A is held in place between the flat pressure receiving seat 2a of the front cylinder block 2 and the annular pressure receiving seat 5a of the swash plate 5. However, first and second dished disc springs or Belleville springs 7a and 7b are disposed between the boss portion of the swash plate 5 and the inner race 61 of the thrust bearing 6A. Namely, the larger dish-like spring 7a is disposed between the above-mentioned annular pressure receiving seat 5a and the inner race 61 of the thrust bearing 6A. The smaller dish-like spring 7b is seated in the circular pressure receiving seat 5a', and disposed so as to maintain a small gap between the face of the dish-like spring 7b and the inner race 61 of the thrust bearing 6A. The small gap is canceled when a load applied to the compressor is increased, and accordingly, the smaller dish-like spring 7b is brought into contact with the inner race 61 of the front thrust bearing 6A.

Therefore, when the front and rear thrust bearings 6A and 6B arranged adjacent to the front and rear boss portions of the swash plate 5 are preloaded by a force transmitted from the front and rear cylinder blocks 2 and 3 via the first dish-like spring 7a in response to screwing of the long screw bolts, the dish-like spring 7a is elastically deformed so as to absorb any axial play in both thrust bearings 6A and 6B and an excessive portion of the applied preload. Thus, the thrust bearings 6A and 6B of the front and rear thrust bearing assemblies can be adjusted and preloaded into a condition in which the thrust bearings 6A and 6B are able to exhibit a stable and rigid mechanical support in the axial direction for the swash plate 5. The spring constant of the first dish-like spring 7a is preliminarily selected so that the elastic deformation of the dish-like spring 7a occurs so as to provide the swash plate 5 with the axial support of which the mechanical rigidity is suitable for the low discharge pressure operation of the compressor. Namely, the mechanical rigidity of the axial support presented to the swash plate 5 by the thrust bearings 6A and 6B via the dish-like spring 7a is very low, so that the swash plate 5 can be relatively smoothly rotated under small frictional resistance to result in small consumption of the drive power given by an automobile to the compressor.

When the compressor is operated at a high discharge pressure, the swash plate 5 is constantly subjected to a large moment acting thereon due to the high discharge pressure. Thus, the swash plate 5 is displaced from the initial position thereof as well as deformed from the initial posture thereof during the rotation of the swash plate 5. Accordingly, the elastic deformation of the first dished disc spring 7a increases, and as a result, the second dish-like spring 7b starts to be elastically deformed until the spring 7b comes into contact with the inner race 61 of the thrust bearing 6A. Thus, the combination of the elastic forces exhibited by both first and second dished disc springs 7a and 7b acts between the inner race 61 of the front thrust bearing 6A and the front boss portion of the swash plate 5. Therefore, the mechanical rigidity of the axial support presented by the thrust bearings 6A of the front thrust bearing assembly is appropriately increased. Consequently, the vibration of the swash plate 5 is suppressed during the high discharge pressure operation of the compressor, and any unfavored noise is not generated.

The first embodiment of the front and rear thrust bearing assemblies may be varied so that a pair of dished disc springs similar to the above-mentioned first and second dished disc springs 7a and 7b may be arranged adjacent to the rear boss portion of the swash plate 5 in a manner such that the pair of springs may cooperate with the rear thrust bearing 6B of the rear thrust bearing assembly to thereby control the mechanical rigidity in the axial support for the swash plate 5.

Nevertheless, since the arrangement of dished disc springs 7a and 7b adjacent to both the front and rear boss portions of the swash plate 5 is apt to cause an unstable vibrating motion of the swash plate due to interference of the two pairs of dished disc springs 7a and 7b, the arrangement of a single pair of dished disc springs 7a and 7b on either the front side or the rear side of the swash plate 5 so as to cooperate with the flat pressure receiving seats 5b and 3b provided on the axially other side of the swash plate 5 is best for suppressing unstable vibration of the swash plate 5 during both low and high discharge pressure operations of the compressor.

Further, in the first embodiment of FIG. 1, it should be noted that the provision of the recessed circular pressure receiving seat 5a' formed in the end of the front boss portion of the swash plate 5 is not indispensable. It should, however, be appreciated that the depth of the recessed circular pressure receiving seat 5a' measured from the annular pressure receiving seat 5a may be adjustably changed depending on a difference in a spring constant of the second dished disc spring 7b. Thus, there is no difficulty in designing of the spring constant of the second dished disc spring 7b, and accordingly, the manufacture of the second spring 7b can be less expensive.

Further, the use of the dished disc springs 7a and 7b are effective from the viewpoint that the accommodation of these springs 7a and 7b in the thrust bearing assemblies of the compressor requires only a very small axial space, and accordingly, a large change in the designing of the compressor construction is not required.

Figure 2:
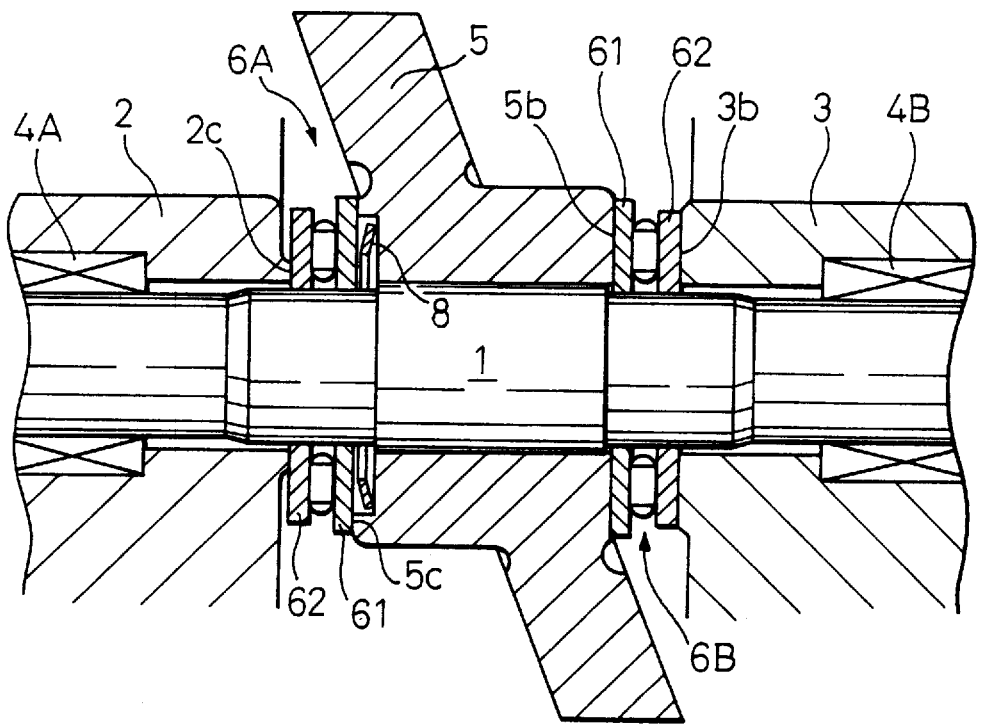
FIG. 2 is a view, similar to FIG. 1, illustrating a thrust bearing assembly accommodated in a double-headed swash plate type refrigerant compressor according to a second embodiment of the present invention.

Referring to FIG. 2, the front and rear thrust bearing assemblies for axially supporting the swash plate 5 of the double-headed swash-plate operated refrigerant compressor according to the second embodiment is shown. In the second embodiment, the rear thrust bearing 6B of the rear thrust bearing assembly is rigidly and stably held in place by a pair of confronting flat pressure receiving seats 5b and 3b in the same manner as the first embodiment of FIG. 1.

The front thrust bearing 6A of the front thrust bearing assembly is held between a small annular pressure receiving seat. 2c formed in the end of the shoulder portion of the cylinder block 2 and a large annular pressure receiving seat 5c formed in the end of the front boss portion of the swash plate 5. Namely, the inner race 61 of the front thrust bearing 6A is abutted against the large annular pressure receiving seat 5c of the boss portion of the swash plate 5 at the outer peripheral portion thereof, and the outer race 62 of the front thrust bearing 6A is abutted against the small annular pressure receiving seat 2c of the shoulder portion of the cylinder block 2 at the inner bore portion thereof. Therefore, when the axial preload is applied, by the front cylinder block 2, to the front thrust bearing 6A, the bearing 6A can be elastically deformed so as to absorb a part of the preload.

Further, in the front thrust bearing assembly, a dished disc spring or Belleville spring 8 is further provided in a circular pressure receiving seat formed in the end of the front boss portion of the swash plate 5 and surrounded by the above-mentioned large annular pressure receiving seat 5c. A small gap or space is usually left between the dished disc spring 8 and the inner race 61 of the front thrust bearing 6A so that the spring 8 is usually not in contact with the front thrust bearing 6A during the low discharge pressure operation of the compressor. The dished disc spring 8 comes in contact with the inner race 61 of the front thrust bearing 6A when the inner race 61 is forced to be deformed so as to cancel the small space, in response to an increase in the compression load applied to the compressor.

In accordance with the above-mentioned construction of the second embodiment, when the swash plate 5 is sandwiched by the front and rear thrust bearings 6A and 6B which are preloaded by an axial pressure provided by screwing of the plurality of long screw bolts (not shown in FIG. 2) through the front and rear cylinder blocks 2 and 3, the inner and outer races 61 and 62 of the front thrust bearing 6A being in contact with the small and large annular pressure receiving seats 5c and 2c are elastically deformed or deflected to remove any axial play left in the front and rear thrust bearings 6A and 6B to thereby provide a rigid support for the swash plate 5. However, at this stage, since the resilience of the inner and outer races 61 and 62 of the thrust bearing 6A is considerably low, the mechanical rigidity of the axial support presented by the front and rear thrust bearings 6A and 6B for the swash plate 5 is not so large, and accordingly, consumption of a drive power transmitted from the automobile engine to the compressor can be small.

When the discharge pressure of the compressor is increased, the inner and outer races 61 and 62 of the front thrust bearing 6A are further elastically deformed due to the displacement of the swash plate 5. Thus, the dished disc spring 8 comes into contact with the inner race 61 of the front thrust bearing 6A, and is subsequently deformed. Therefore, the spring force exhibited by the dished disc spring 8 provides the swash plate 5 with an additional mechanical rigidity to that in the axial support presented by the front and rear thrust bearings 6A and 6B. Accordingly, the swash plate 5 can be prevented from vibrating and therefore, the generation of noise is suppressed.

It should be noted that since the rear thrust bearing 6B arranged adjacent to the rear boss portion of the swash plate 5 is rigidly held in place by the end of the shoulder portion of the rear cylinder block 3 and the end of the rear boss portion of the swash plate 5, and is maintained at an appropriately preloaded condition, the swash plate 5 can be prevented from unstably vibrating during the high discharge pressure operation of the compressor.

Further, the use of the dished disc spring 8 as an elastic element can enjoy the same advantageous effect as the first embodiment.

Figure 3:
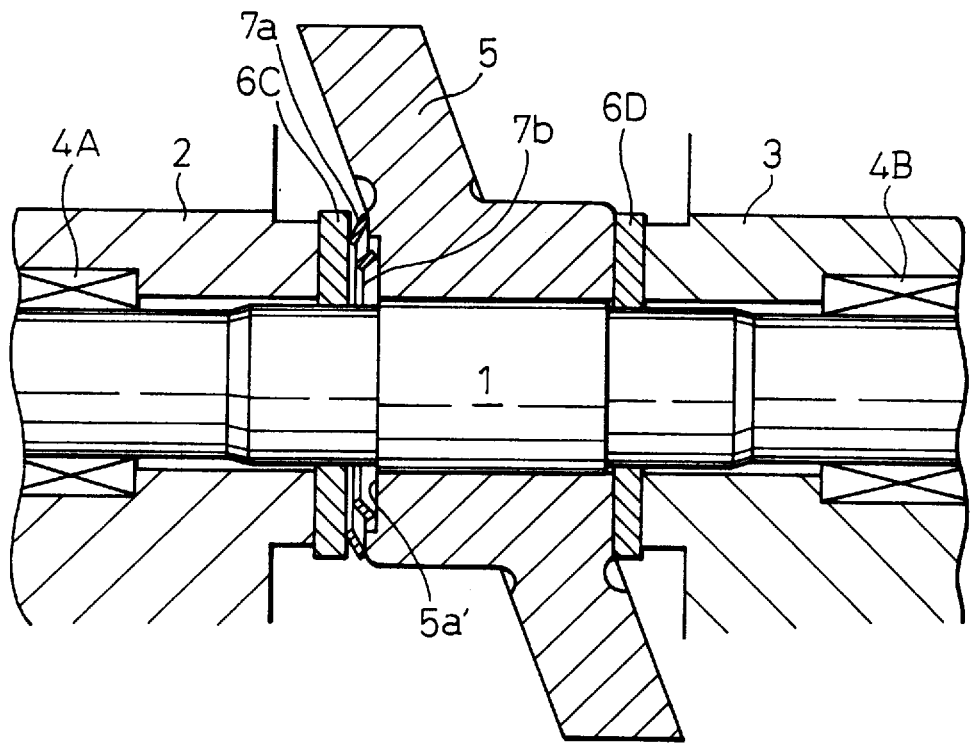
FIG. 3 is a view, similar to FIG. 1, illustrating a variation of the first embodiment of FIG. 1.
Figure 4:
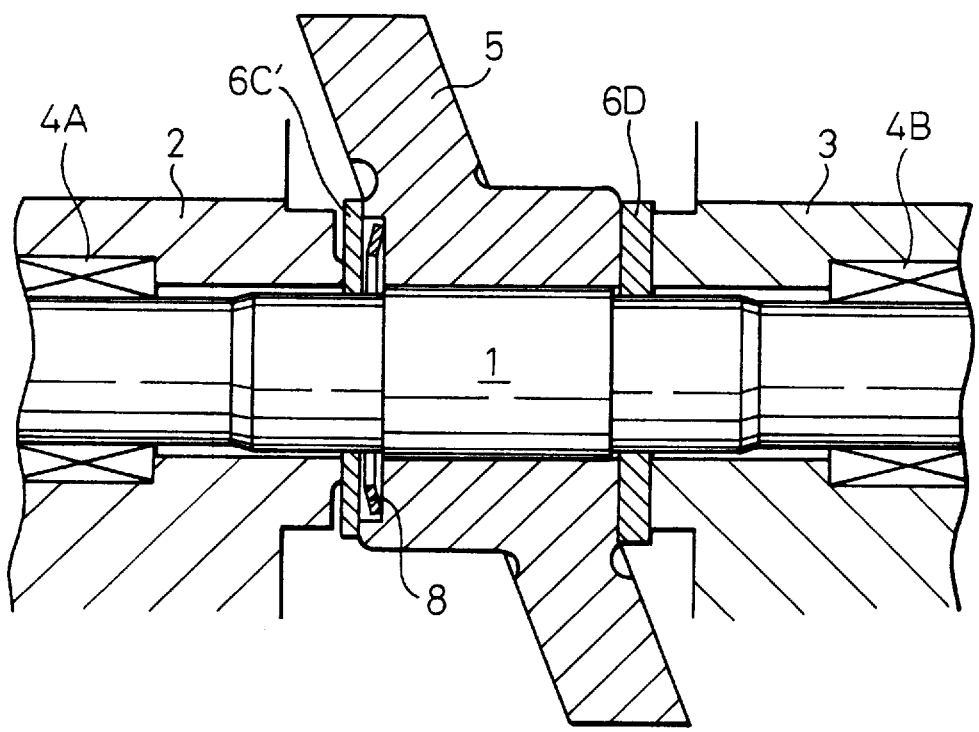
FIG. 4 is a view, similar to FIG. 2, illustrating a variation of the second embodiment of FIG. 2.

Referring to FIGS. 3 and 4, two variations of the aforementioned first and second embodiments are shown. Namely, in the variation of the first embodiment, shown in FIG. 3, the aforementioned front and rear thrust bearings 6A and 6B which are thrust needle bearings are replaced with flat thrust bearings 6C and 6D in the shape of a flat rigid slide-plate, respectively.

Further, in a variation on the second embodiment shown in FIG. 4, the front and rear thrust bearings 6A and 6B consisting of needle type thrust bearings are replaced with a flat thrust bearing 6C' in the shape of an elastically deformable flat slide plate, and a flat rigid thrust bearing 6D in the shape of a flat rigid slide-plate. The flat thrust bearing 6C' can elastically deform so as to absorb an axial load applied thereto during the operation of the compressor.

The other construction of the front and rear thrust bearing assemblies of the variations of FIGS. 3 and 4 is the same as that of the first embodiment or that of the second embodiment. Therefore, in accordance with the two variations of FIGS. 3 and 4, the mechanical rigidity in the axial support provided for the swash plate 5 by the front and rear thrust bearing assemblies changes stepwise in response to a change in the discharge pressure of the compressor. Thus, during the low discharge pressure operation of the compressor, the front and rear thrust bearing assemblies provide the swash plate 5 with a low rigid axial support, so that consumption of the drive power presented by the automobile engine to the compressor can be reduced. During the high discharge pressure operation of the compressor, the front and rear thrust bearing assemblies provide the swash plate 5 with an increased rigid axial support, so that the vibrating motion of the swash plate 5 due to the high discharge pressure can be prevented.

The flat slide-plate type thrust bearings 6C, 6C' and 6D used in the variations of FIGS. 3 and 4 are advantageous over the needle type thrust bearings 6A and 6B in that noise generation by the thrust bearings per se can be reduced, and that the flat slide-plate type thrust can be cheap.

From the foregoing description, it will be understood that in accordance with the present invention, there is provided thrust bearing assemblies, for axially supporting a swash plate mounted on a drive shaft of a double-headed swash-plate operated refrigerant compressor, which include means for changing mechanical supporting rigidity presented for the swash plate stepwise in response to a change in the discharge pressure of the compressor from a low discharge pressure to a high discharge pressure and vice versa. Thus, during the low discharge pressure operation of the compressor, consumption of the drive power of the compressor can be small, and during the high discharge pressure operation of the compressor, vibration of the swash plate can be suppressed to sufficiently reduce generation of noise.

It should be understood that the described preferred embodiments may be further modified. For example, the dished disc springs employed in the described embodiments may be replaced with other suitable elastic elements such as coil springs. Many variations and modifications will occur to persons skilled in the art without departing from the spirit and scope of the invention as claimed in the accompanying claims.

We claim:

1. A double-headed swash-plate operated refrigerant compressor comprising:

a pair of axially combined front and rear cylinder blocks defining cylinder bores for slidably receiving a plurality of double-headed pistons to compress a refrigerant gas therein, said axially combined cylinder blocks having a pair of front and rear shoulder portions axially spaced apart from and confronting one another at an axially central portion thereof;

front and rear housings arranged for closing front and rear ends of said axially combined cylinder blocks;

an axial drive shaft rotatably supported, via radial bearings, in an axially extending bore centrally formed in said front housing and said combined cylinder blocks;

a swash plate mounted on said drive shaft and rotated together with said drive shaft so as to cause reciprocation of said double-headed pistons, said swash plate being disposed at a position between said front and rear shoulder portions of said combined cylinder blocks and having front and rear boss portions confronting said front and rear shoulder portions of said combined cylinder blocks; and front and rear thrust bearing assemblies including front and rear thrust bearings arranged between said front shoulder and boss portions, and between said rear shoulder and boss portions for providing a rigid axial support for said swash plate during rotation of said swash plate about an axis of rotation thereof;

wherein at least one of said front and rear thrust bearing assemblies comprises elastic means arranged between one of said front and rear thrust bearings and one of said front and rear boss portions of said swash plate, said elastic means cooperating with said one of said front and rear thrust bearings so as to change rigidity of the axial support for said swash plate in a stepwise manner in response to a change in an operating condition of said compressor from a low to high discharge pressure operation and vice versa.

2. A double-headed swash-plate operated refrigerant compressor according to claim 1, wherein each of said front and rear thrust bearings comprises a needle type thrust bearing including inner and outer races and a plurality of needles disposed between said inner and outer races, and wherein one of said front and rear thrust bearings is arranged in a manner such that said outer race thereof is in close contact with a flat pressure receiving seat formed in said one of said shoulder portions of said front and rear cylinder blocks so as not to be deformable, and said inner race thereof is in constant contact with said elastic means.

3. A double-headed swash-plate operated refrigerant compressor according to claim 1, wherein each of said front and rear thrust bearings comprises a needle type thrust bearing including inner and outer races and a plurality of needles disposed between said inner and outer races, and wherein one of said front and rear thrust bearings is arranged in a manner such that a radially inner portion of said outer race thereof is in constant contact with a small annular pressure receiving seat formed in said one of said shoulder portions of said front and rear cylinder blocks so that said outer race is deformable, and a radially outer portion of said inner race thereof is in constant contact with a large annular pressure receiving seat formed in one of said front and rear boss portions of said swash plate so that said inner race is deformable and comes into contact with said elastic means when said operating condition of said compressor is in the high discharge pressure operation.

4. A double-headed swash-plate operated refrigerant compressor according to claim 3, wherein said elastic means comprises a single dished disc spring element received in a circular seat recessed in said one of said front and rear boss portions of said swash plate.

5. A double-headed swash-plate operated refrigerant compressor according to claim 1, wherein said other of said front and rear thrust bearings of said front and rear thrust bearing assemblies is in close contact with flat pressure receiving seats formed in said shoulder and boss portions of said one of said front and rear cylinder blocks and said swash plate so as to prevent said thrust bearing from being deformed.

6. A double-headed swash-plate operated refrigerant compressor according to claim 5, wherein said other of said front and rear thrust bearings comprises a needle type thrust bearing having inner and outer races and a plurality of needles disposed between said inner and outer races.

7. A double-headed swash-plate operated refrigerant compressor according to claim 1, wherein said elastic means comprises first and second dished disc springs, said first dished disc spring being constantly in contact with said one of said front and rear thrust bearings to thereby constantly apply a preload to the contacting thrust bearing irrespective of a change in the operating condition of the compressor, and said second dished disc spring coming into contact with said one of said front and rear thrust bearings to thereby increase the preload applied to said thrust bearing contacting with said first dished disc spring when the operating condition of said compressor changes from the low discharge pressure operation to the high discharge pressure operation.

8. A double-headed swash-plate operated refrigerant compressor according to claim 1, wherein each of said thrust bearings of said front and rear thrust bearing assemblies comprises a flat disc type thrust bearing including a slidable plate.

9. A double-headed swash-plate operated refrigerant compressor according to claim 8, wherein one of said flat disc type thrust bearings of said front and rear thrust bearing assemblies has opposite flat faces formed in said slidable plate, and is arranged in such a manner that one of said flat opposite faces is in constant contact with a small annular pressure receiving seat formed in said one of said shoulder portions of said front and rear cylinder blocks, and the other of said flat opposite faces is in constant contact with a large annular pressure receiving seat formed in one of said front and rear boss portions of said swash plate, said slidable plate being deformable so as to come into contact with said elastic means when said operating condition of said compressor is in the high discharge pressure operation.

10. A double-headed swash-plate operated refrigerant compressor according to claim 9, wherein said elastic means comprises a single dished disc spring seated in a circular seat recessed in said one of said front and rear boss portions of said swash plate, and arranged radially inside said large annular pressure receipt seat.

* * * * *